Jan. 9, 1951   J. HULMAN ET AL   2,537,057
AUTOMATIC TWO-SPEED DRIVE
Filed Nov. 7, 1946   5 Sheets-Sheet 1
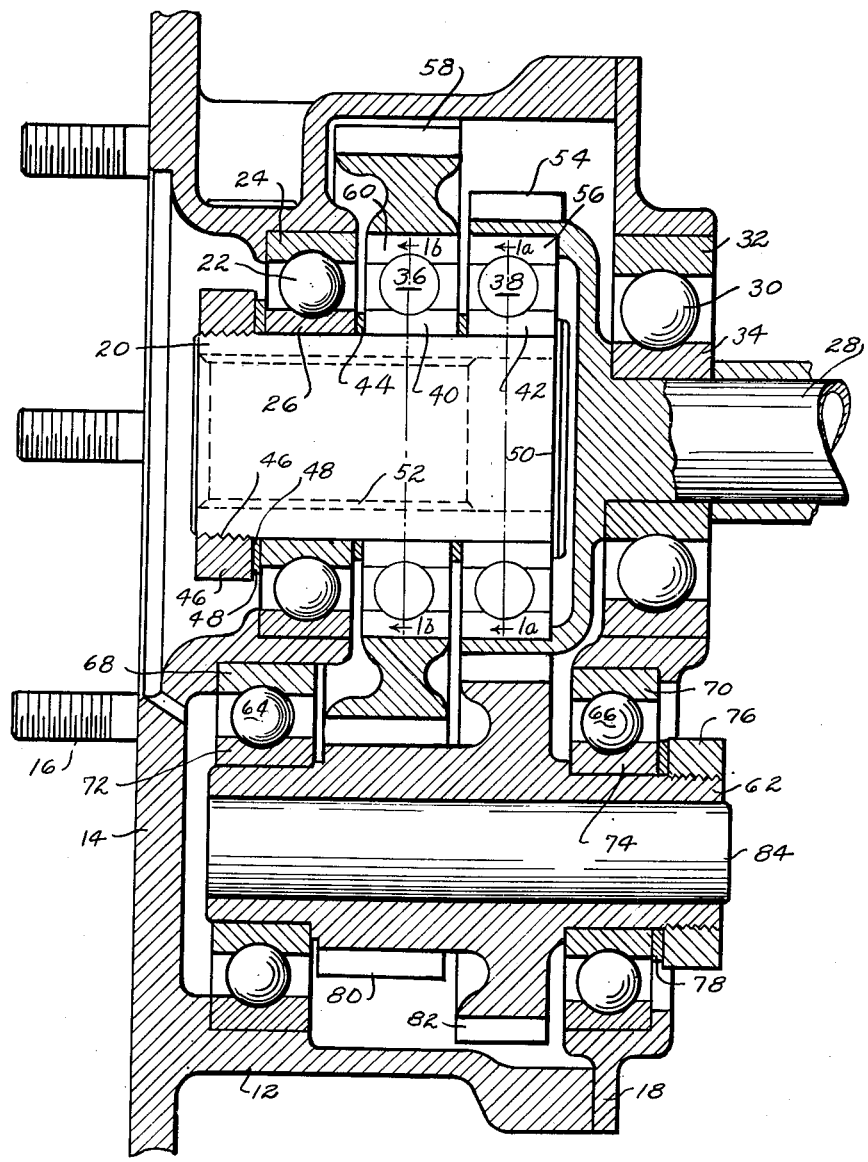
INVENTORS
JULIUS HULMAN, AND
CARL L. SADLER JR.
BY Wade Koontz AND
Frederick W. Cotterman
ATTORNEYS Jan. 9, 1951  J. HULMAN ET AL  2,537,057
AUTOMATIC TWO-SPEED DRIVE
Filed Nov. 7, 1946  5 Sheets-Sheet 2

INVENTORS.
JULIUS HULMAN AND
CARL L. SADLER JR.
BY Wade Koontz AND
Frederick W. Cotterman
ATTORNEYS

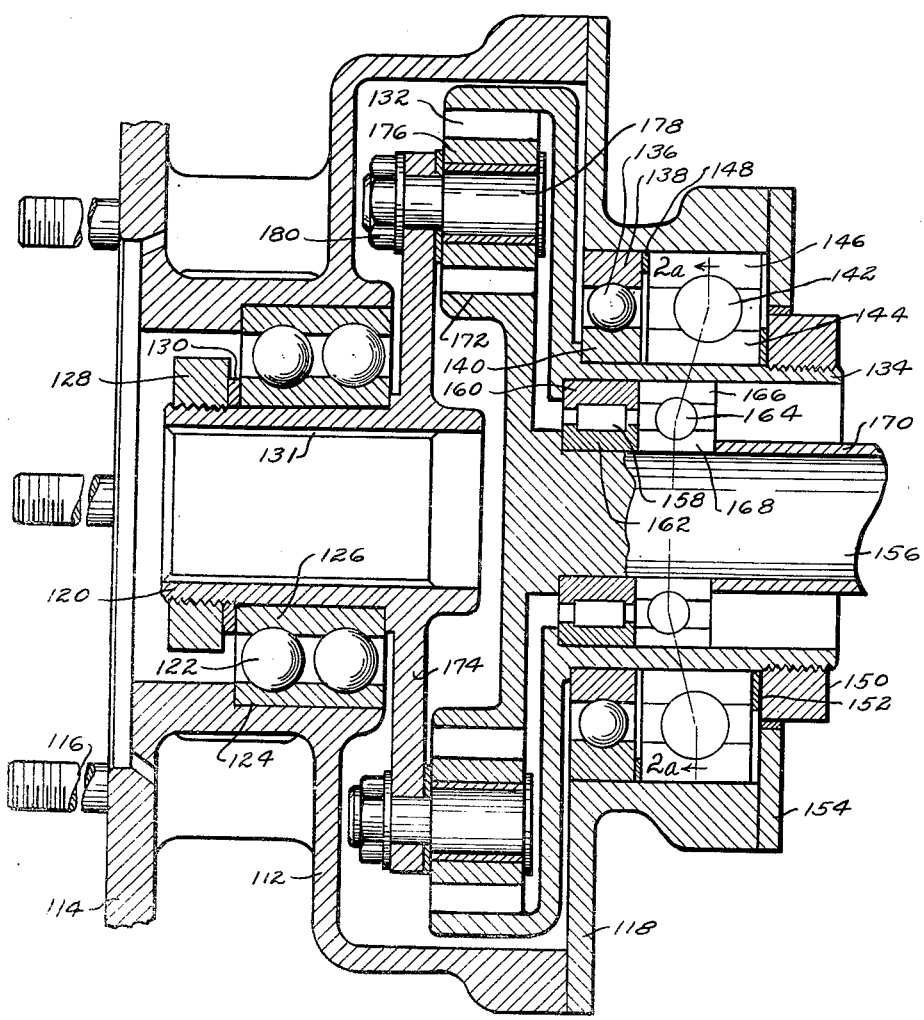

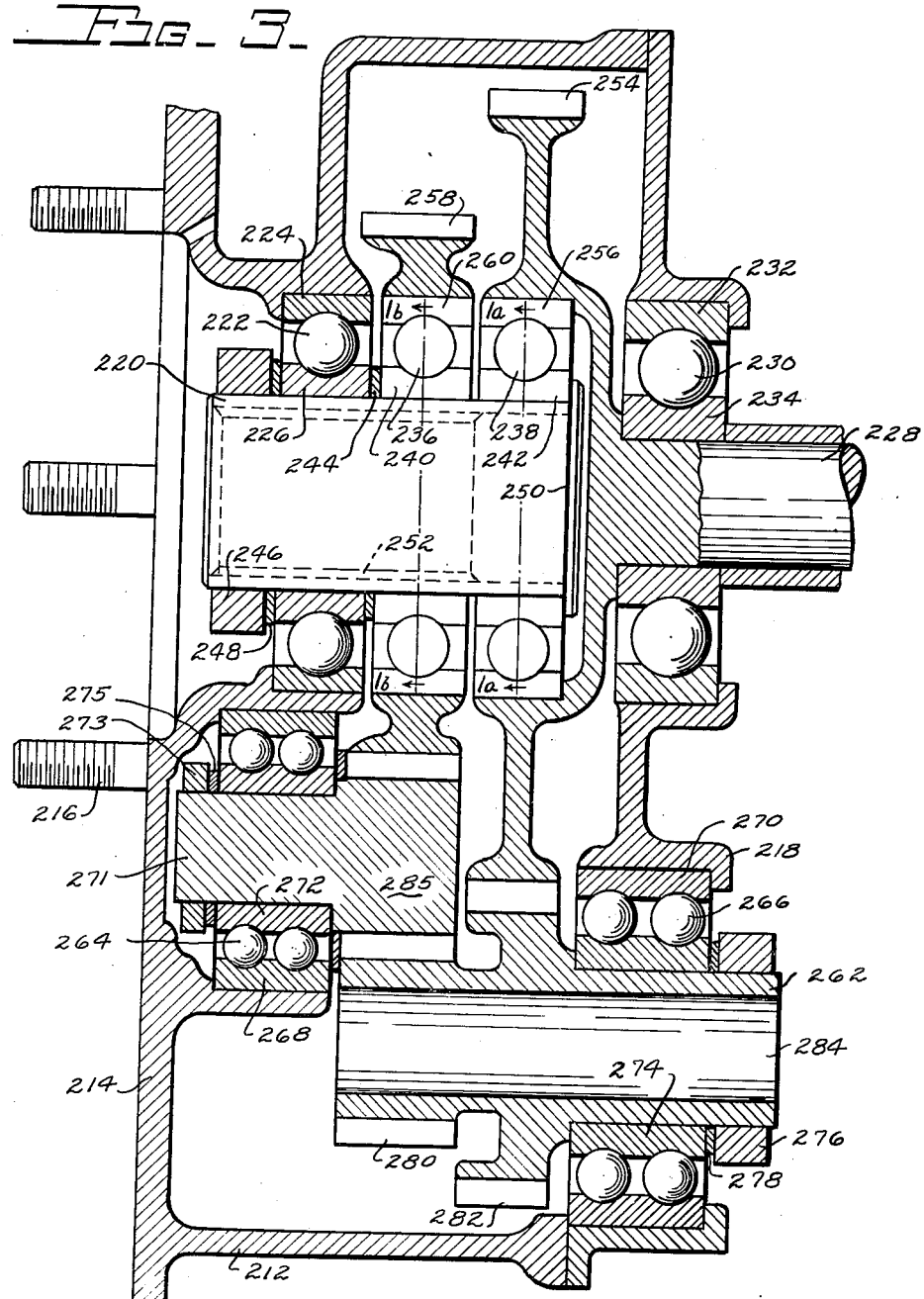

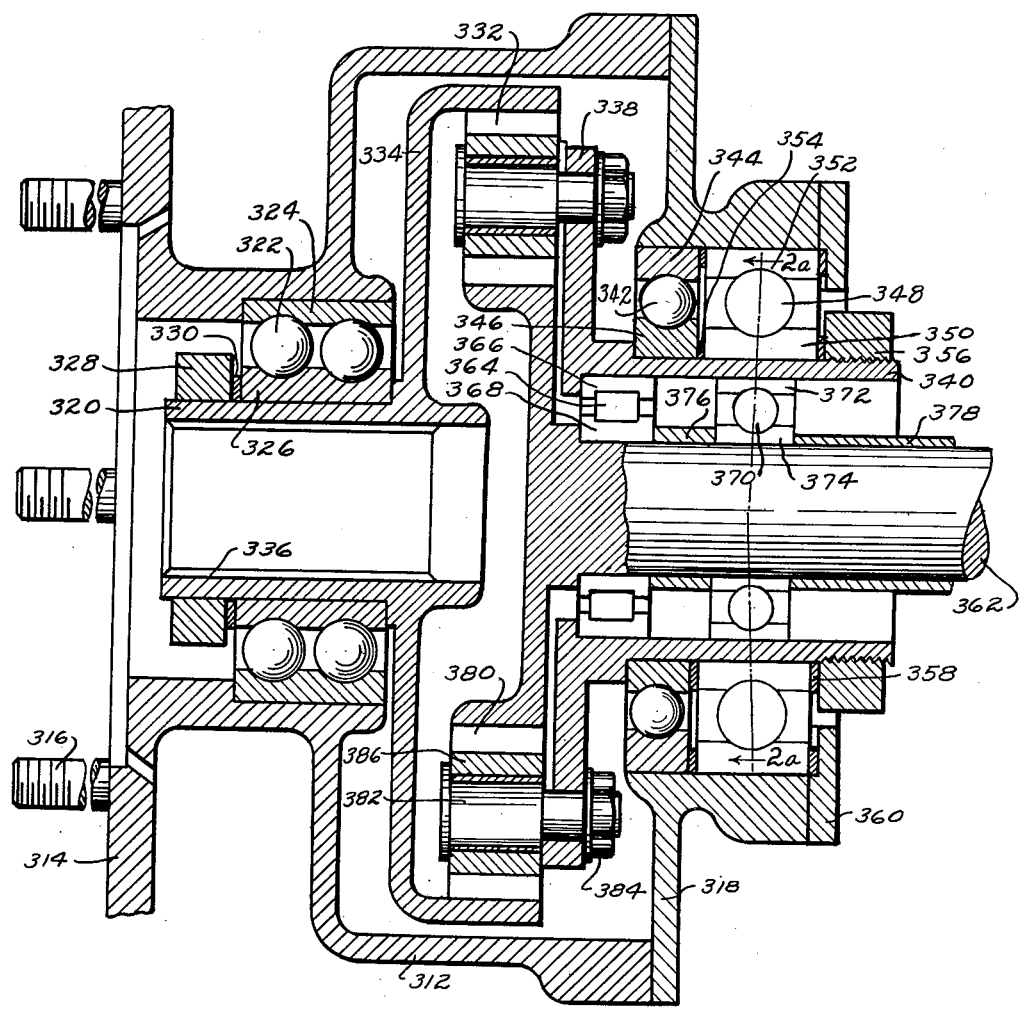

Patented Jan. 9, 1951

2,537,057

UNITED STATES PATENT OFFICE 2,537,057

AUTOMATIC TWO-SPEED DRIVE

Julius Hulman, Dayton, Ohio, and Carl L.
Sadler, Jr., Swarthmore, Pa.

Application November 7, 1946, Serial No. 708,372
9 Claims. (Cl. 74—810)

(Granted under the act of March 3, 1883, as
amended April 30, 1928; 370 O. G. 757)

The invention described herein may be manufactured and used by or for the Government for governmental purposes without payment to me of any royalty thereon.

This invention relates to power transmission gearing and particularly to a two speed gear set of the type wherein the ratios change automatically when the output member becomes the input member and vice versa.

The starter generator, or its hydraulic counterpart the motor-pump, is coming into use on the modern high speed power plant for aircraft and since the starting cycle is completed before the engine has reached nearly its full speed, it becomes desirable to employ greater speed reduction between the engine and generator after the engine is started than is employed between the generator and engine during the starting period, which is just the opposite of what is current automotive practice.

It is therefore an object of this invention to provide a gear mechanism particularly adapted to the above use but which will be applicable to any situation which requires different gear ratios between two rotatable elements depending on which element is the driver and which is the driven.

Another object is to provide a device wherein rotation of the driving member in either direction produces rotation of the driven member at the same time or at a different speed and in the same direction.

Another object is to provide a mechanism in which the driven member will free wheel forwardly but will lock up against backward rotation.

Other objects and advantages will become evident from a consideration of the following description, considered with reference to the drawings, wherein Fig. 1 is an axial section through a simple form of my invention which is particularly applicable where an electric starter-generator or a hydraulic motor-pump combination is to be employed for driving an engine at one-to-one ratio in starting but which will be driven by the engine at a greater speed reduction after the engine is started, the gearing being of the external spur type with countershaft.

Fig. 2 is an axial section through another form of my invention which is intended for the same general purpose as the device shown in Fig. 1, but wherein planetary instead of external spur gearing is employed.

Fig. 3 is an axial section through an external spur gear mechanism made in accordance with my invention wherein the driven member is rotated in the same direction by rotation of the driving member in either direction and wherein the driven member may overrun the driving member and the driven member locks against backward rotation.

Fig. 4 is an axial section through another exemplification of my invention which performs the same function as Fig. 3, i. e., the driving member by rotating in either direction rotates the driven member in the same direction, the driven member free-wheels forwardly and locks against backward rotation.

Like reference characters refer to like parts throughout the several views.

Figure 1A:
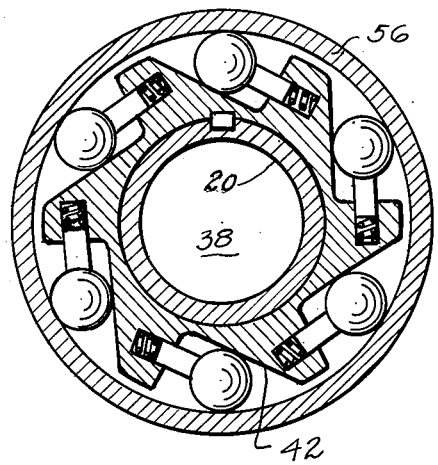
Figs. 1a and 1b are transverse sections taken at 1a—1a and 1b—1b respectively of Fig. 1 or Fig. 3.
Figure 1B:
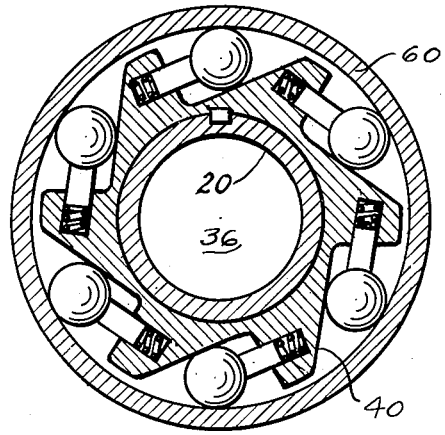

Referring to the drawing and more particularly to Fig. 1, a housing 12 on one end has a mounting flange 14 and mounting studs 16 whereby a starter-generator or a hydraulic motor-pump combination may be secured to one end of the housing. A bearing head 18 is secured to the opposite end of the housing by appropriate means (not shown).

A hollow shaft 20, for present purposes of explanation, may be called the drive shaft, although it becomes the driven shaft under certain conditions in the operation of the device. Drive shaft 20 is rotatable in an antifriction bearing 22, the outer race 24 of which is supported in the housing 12 and the inner race 26 of which is snugly fitted to the shaft 20.

A shaft 28, which may initially be the driven shaft but may become the drive shaft during the course of operation, is coaxial with the shaft 20 and has rotative support in an antifriction bearing 30, the outer race 32 of which is supported in the bearing head 18 and the inner race 34 of which is fitted to the shaft 28.

Overrunning clutches 36 and 38 have their inner members 40 and 42 snugly fitted to the shaft 20. Spacers 44 separate the bearing and clutch parts. A nut 46 and lock washer 48 clamp the inner members 26, 40, 42 together and against a head 50 on the end of the shaft 20. The shaft 20 is internally splined at 52 to receive the driving member of the starter-generator or motor-pump.

An externally toothed gear 54 is integral with the shaft 28 or may be otherwise secured thereto. A pocket on the inside of the gear 54 receives the outer member 56 of the overrunning clutch 38. A second externally toothed gear 58 is carried on the outer member 60 of the overrunning clutch 36. The overrunning clutch 36 is designed to drive when the inner member 40 is rotated anticlockwise or the outer member 60 is rotated clockwise, while the overrunning clutch 38 is designed to drive when the inner member 42 is rotated clockwise or the outer member 56 is rotated anticlockwise. When the term "clockwise" or "anticlockwise" is herein employed, it may be taken to mean clockwise or anticlockwise when viewed from the right and looking toward the left of the drawing.

A countershaft 62 is rotatable in antifriction bearings 64 and 66, the outer race 68 of the bearing 64 being carried in the housing 12 and the outer race 70 of the bearing 66 being carried in the bearing head 18. The inner race 72 of the bearing 64 is press fitted to the shaft 62, the inner race 74 of the bearing 66 being additionally secured by a nut 76 and lock washer 78. A cluster gear integral with the shaft 62 consists of a small gear 80 and a somewhat larger gear 82 which mesh respectively with the gears 58 and 54. The countershaft 62 is hollowed as at 84 for lightness.

The operation of the gear mechanism shown in Fig. 1 is substantially as follows:

Let it be assumed that a starter-generator is mounted on the flange 14 and secured by means of nuts on studs 16 and that its drive shaft is engaged with the splines 52, and that an internal combustion engine is drivably connected to the shaft 28.

Now let shaft 20 be rotated clockwise as when driven by the starter. Since the inner member 40 of overrunning clutch 36 drives the outer member 60 only upon anticlockwise rotation of said inner member, the clutch 36 will overrun. The inner member 42 of overrunning clutch 38, however, drives upon clockwise rotation. The gear 54, and consequently the shaft 28, will therefore be rotated at one to one ratio by the shaft 20.

Now let shaft 28 be rotated clockwise as when driven by the engine. Since the outer member 56 of the overrunning clutch 38 drives only upon anticlockwise rotation, clutch 38 will overrun. Shaft 28, rotating clockwise, will drive through gears 54, 82, 80 and 58 to the outer member 60 of overrunning clutch 36, which, rotating clockwise, will rotate the shaft 20 clockwise but at a speed below that of the shaft 28.

It will be seen that when the engine is being revolved by the starter, the ratio of starter to engine is one to one, but when the engine drives the generator, the ratio is somewhat less than one to one. Obviously, the size of the gears 54, 82, 80, and 58 may be altered so as to provide a ratio of one to one or a ratio of more than one to one engine to generator if so desired.

Figure 2A:
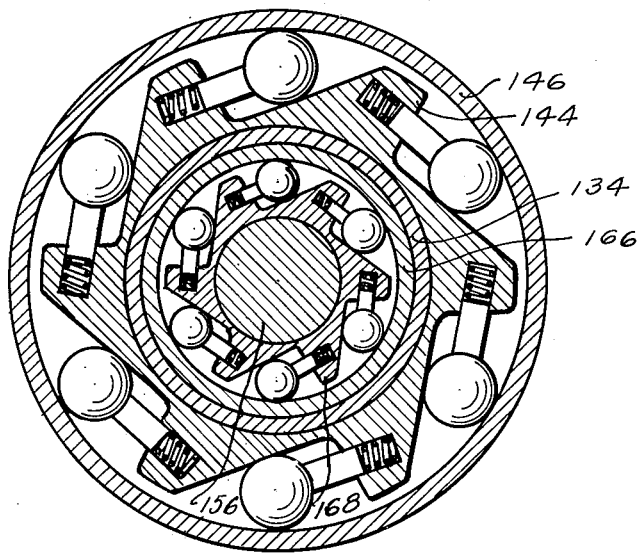
Fig. 2a is a transverse section taken at 2a—2a of Fig. 2 or Fig. 4.

Referring to the drawing and more particularly to Fig. 2, a housing 112 on one end has a mounting flange 114 and mounting studs 116 for securing a starter-generator or similar device. A bearing head 118 is secured to the opposite end of the housing by screws or similar means (not shown).

A hollow drive shaft 120, which may also become the driven shaft, is rotatable in an antifriction bearing 122, the outer race 124 of which is supported in the housing 112 and the inner race 126 of which is snugly fitted to the shaft 120. A nut 128 and lockwasher 130 is provided for securing the bearing on the shaft. The shaft 120 is internally splined as at 131.

Coaxial with the drive shaft 120 is a ring gear 132 having an elongated hollow hub 134 which is rotatably mounted in an antifriction bearing 136, the outer race 138 of which is supported in the bearing head 118, the inner race 140 being snugly fitted to the hub 134. A one-way brake 142 has its inner member 144 fitted to the hub 134, its outer member 146 being supported in the bearing head 118. Brake 142 is so constructed that its inner member 144 may rotate clockwise, but not anticlockwise, as viewed from right to left on the drawing. A spacing ring 148 separates the bearing 136 and the one-way brake 142. A nut 150 and lock washer 152 clamps the bearing and brake together on the hub 134. A cover plate 154 closes the end of the hub of the bearing head 118.

Coaxial with and rotatably mounted within the elongated hub 134 is a driven shaft 156. An antifriction bearing 158 has its outer race 160 fitted to the inside of the hub 134 and its inner race 162 fitted to the shaft 156. An overrunning clutch 164 has its outer member 166 fitted to the inside of the hub 134 and its inner member 168 fitted to the outside of the driven shaft 156. A spacing tube 170 holds the bearing 158 and overrunning clutch 162 in position on the shaft 156. The clutch 164 is so constructed and arranged that the outer member 166 must rotate clockwise viewed from right to left to drive the inner member 168, but the inner member 168 must rotate anticlockwise to drive the outer member 166.

The inner end of the driven shaft 156 is provided integrally with a sun gear 172 of equal face and in the same plane as the ring gear 132. Adjacent the ring and sun gears 132 and 172 a planet pinion carrier flange 174 extends integrally from the driving shaft 120. Planet pinions 176 are rotatable on studs 178 which are held in the carrier by nuts 180. The planet pinions 176 are permanently in mesh with both the sun gear 172 and the ring gear 132.

The operation of the gear mechanism shown in Fig. 2 is substantially as follows:

Let is be assumed that a starter-generator is mounted on the flange 114 by means of nuts on studs 116, and that its drive shaft is engaged with the splines 131, and that an internal combustion engine is drivably connected to the shaft 156.

Now let shaft 120 be rotated clockwise as when driven by the starter. Since the load is on the driven shaft 156, the tendency will be for shaft 156 to remain nonrotative and for the carrier 174 to roll the pinions 176 clockwise around the sun gear 172 and thereby drive the ring gear clockwise at a faster speed than the carrier. The one-way brake 142 would permit this but the overrunning clutch 164 will not permit the ring gear 132 to revolve faster than the sun gear 172. The result will be a one to one ratio from the drive shaft 120 to the driven shaft 156.

Now let shaft 156 be rotated clockwise as when driven by the engine. Since the inner member 168 of overrunning clutch 164 may overrun the outer member 166, the ring gear 132 cannot be driven through this clutch. The load, however, is now on the driving shaft so that clockwise rotation of the sun gear 172 tends to rotate the ring gear 132 anticlockwise. Ring gear 132, however, cannot rotate anticlockwise because of the one-way brake 142, whereby the shaft 120 is rotated by the shaft 156 but at a reduced speed.

The exemplification of the invention shown in Fig. 2 therefore accomplishes the same purpose as that shown in Fig. 1, but with different gearing differently arranged.

Referring now to Fig. 3 of the drawing, a housing 212 on one end has a mounting flange 214 and studs 216 for attachment of an electric starter or like device. A bearing head 218 is secured to the opposite end of the housing by screws (not shown).

A hollow drive shaft 220 is rotatable in an antifriction bearing 222, the outer race 224 of which is supported in the housing 212, and the inner race 226 of which is snugly fitted to the shaft 220.

A driven shaft 228 is coaxial with the shaft 220 and has rotative support in an antifriction bearing 230, the outer race 232 of which is supported in the bearing head 218, and the inner race 234 of which is fitted to the shaft 228.

Overrunning clutches 236 and 238 have their inner members 240 and 242 snugly fitted to the shaft 220. Spacers 244 separate the bearing and clutch parts. A nut 246 and lock washer 248 clamp the inner members 226, 240, 242 together against a head 250 on the end of the shaft 220. The shaft 220 is internally splined at 252 to receive the driving member of a suitable power source.

An externally toothed gear 254 is integral with the shaft 228. A pocket on the inside of the gear 254 receives the outer member 256 of the overrunning clutch 238. A second externally toothed gear 258 is carried on the outer member 260 of the overrunning clutch 236. The overrunning clutch 236 is designed to drive when the inner member 240 is rotated anticlockwise or the outer member 260 is rotated clockwise, while the overrunning clutch 238 is designed to drive when the inner member 242 is rotated clockwise or the outer member 256 is rotated anticlockwise, all as viewed from right to left in the drawing.

A countershaft 262 is rotatable in an antifriction bearing 266, the outer race 270 of which is carried in the bearing head 218. An idler shaft 271 is rotatable in an antifriction bearing 264, the outer race 268 of which is supported in the housing 212. The inner race 274 of the bearing 266 is secured on the countershaft 262 by a nut 276 and lock washer 278, while the inner race 272 of the bearing 264 is secured on the idler shaft 271 by a nut 273 and lock washer 275. A cluster gear integral with the countershaft 262 consists of a small gear 280 and a somewhat larger gear 282 which mesh respectively with the gears 258 and 254. A pinion 285 carried on the idler shaft 271 is in constant mesh with the gears 280 and 258. The countershaft 262 may be hollowed as at 284 for lightness.

The operation of the gear mechanism of Fig. 3 is substantially as follows:

Let it be assumed that an electric starter, a hydraulic motor, or a similar device has been mounted on the flange 214 by means of nuts on studs 216, and that its drive shaft is engaged with the splines 252 of the shaft 220.

Now let shaft 220 be rotated clockwise when viewed from right to left. Since the inner member 240 of the overrunning clutch 236 drives the outer member 260 only upon anticlockwise rotation of said inner member, the clutch 236 will overrun. The inner member 242 of overrunning clutch 238, however, drives upon clockwise rotation. The gear 254 and consequently the shaft 228 will therefore be rotated at one to one ratio by the shaft 220.

Now rotate shaft 220 anticlockwise. Clutch 238 will now overrun. Gear 258, however, will be driven anticlockwise through overrunning clutch 236 whereby gear 254 will be driven clockwise through idler gear 285 and countershaft gears 280 and 282. The driven shaft 228 will therefore be driven clockwise at a higher or lower or at a one to one ratio depending upon the relative sizes of the several gears. Thus it is seen that the driven shaft 228 will rotate clockwise upon rotation in either direction of the driving shaft 220.

In this embodiment, the shaft 228 cannot operate as the driving member, for, if it is rotated clockwise, the clutch 238 will overrun and the gear 258 will be rotated anticlockwise, whereby the clutch 236 will overrun. Thus clockwise rotation of the driven shaft 228 will not rotate the driving shaft 220. This makes this modification particularly applicable where a starter only instead of a starter-generator is to be employed.

Moreover, driven shaft 228 cannot be rotated anticlockwise, for, while it attempts to drive the shaft 220 anticlockwise through the clutch 238, the gear 258 is now rotating clockwise, whereby it attempts to drive the shaft 220 clockwise through the overrunning clutch 236. The result is that the driven shaft 228, in addition to free wheeling upon forward rotation, also locks against backward rotation.

Referring to Fig. 4 of the drawing, a housing 312 on one end has a mounting flange 314 and studs 316 for attachment of a starting unit. A bearing head 318 is secured to the opposite end of the housing by screws (not shown).

A hollow drive shaft 320 is rotatable in an antifriction bearing 322, the outer race 324 of which is supported in the housing 312, and the inner race 326 of which is snugly fitted to the shaft 320. At the outer end a nut 328 and lock washer 330 is provided for securing the bearing on the shaft. A ring gear 332 is carried on a flange 334 at the inner end of the shaft. Shaft 320 is internally splined as at 336.

Coaxial with the drive shaft 320 is a planet pinion carrier 338 having an elongated hollow hub 340 which is rotatably mounted in an antifriction bearing 342, the outer race 344 of which is supported in the bearing head 318, the inner race 346 being snugly fitted to the hub 340. A one-way brake 348 has its inner member 350 fitted to the hub 340, its outer member 352 being supported in the bearing head 318. Brake 348 is so constructed that its inner member 350 may rotate clockwise but not anticlockwise, viewed from right to left in the drawing. A spacing ring 354 separates the bearing 342 from the one-way brake 348. A nut 356 and lockwasher 358 clamp the bearing 342 and brake 348 together on the hub 340. A cover plate 360 closes the end of the hub of the bearing head 318.

Coaxial with and rotatably mounted within the elongated hub 340 is a driven shaft 362. An antifriction bearing 364 has its outer race 366 fitted to the inside of the hub 340 and its inner race 368 fitted to the shaft 362. An overrunning clutch 370 has its outer member 372 fitted to the inside of the hub 340 and its inner member 374 fitted to the outside of the driven shaft 362. Spacing tubes 376 and 378 position the bearing 364 and clutch 370 on the shaft 362. The clutch 370 is so constructed and arranged that the outer member 372 must rotate clockwise, viewed from right to left to drive the inner member 374, but the inner member 374 must rotate anticlockwise to drive the outer member 372.

The inner end of the driven shaft 362 is provided with an integral sun gear 380, and the planet pinion carrier 338 is provided with studs 382 which are held in the carrier by nuts 384. Planet pinions 386 are freely rotatable on the studs 382, the pinions being of a size and positioned to be in constant mesh with both the sun gear 380 and the ring gear 332.

The operation of the gear mechanism shown in Fig. 4 is substantially as follows:

Let it be assumed that an electric starter, a hydraulic motor, or a similar device is mounted on the flange 314 by means of nuts on studs 316, and that its drive shaft is engaged with the splines 336 of the hollow driving shaft 320, and that an internal combustion engine is drivably connected to the driven shaft 362.

Now let shaft 320 be rotated clockwise, as when it is being driven by a starter. Since the load on the shaft 362 tends to hold it and its sun gear 380 against rotation, the ring gear 332 tends to roll the planet pinions 386 clockwise around the sun gear which would rotate the carrier clockwise. The carrier, however, cannot rotate clockwise without taking the sun gear 380 with it because of the brake 370. Since the inner member of clutch 348 can rotate clockwise, the result is the carrier and the sun gear rotate in unison and thereby produce a one to one driver to driven ratio.

Now rotate drive shaft 320 anticlockwise. The load is still on the shaft 362, whereby the ring gear 332 will roll the pinions 386 anticlockwise around the nonrotating sun gear taking the carrier anticlockwise, the carrier, however, cannot rotate anticlockwise because of the brake 348, so the carrier remains nonrotative and the planet pinions become idlers through which the anticlockwise rotating ring gear 332 drives the sun gear 380 and its shaft 362 clockwise at increased speed. It is now noted that rotation of the drive shaft 320 in either direction drives the driven shaft 362 in the same direction.

If driven shaft 362 becomes the driver, clutch 370 will overrun. Since the load will now be on the shaft 320, the clockwise rotating sun gear 380 will roll the planet pinions 386 around the inside of the ring gear 332, thereby rotating the carrier 338 clockwise. Since the brake 348 does not oppose clockwise rotation of the carrier, no rotation will be imparted to the shaft 320, that is, the shaft 362 free wheels going clockwise.

If an attempt is made to rotate the driven shaft 362 anticlockwise, the clutch 370 will take hold and try to rotate the carrier 338 anticlockwise. The carrier 338, however, cannot rotate anticlockwise because of the brake 348. The shaft 362 therefore locks against anticlockwise rotation.

It is noted that the exemplification shown in Fig. 4 performs the same functions as that shown in Fig. 3. but has different gearing which is differently arranged.

Throughout the descriptions of the several embodiments of the invention herein shown, reference is made to clockwise and anticlockwise directions of rotation. It will, however, be understood that it is only necessary to remove the several overrunning clutches and one-way brakes, turn them end for end and replace them whereby "clockwise" in the descriptions will become "anticlockwise" and vice versa.

Having described several embodiments of our invention, their construction and operation, we claim:

1. In a power transmitting mechanism, the combination of a driving member, a driven member, two overrunning clutches each having a driving part and a driven part, the driving parts being fast on the driving member, the driving part of the first overrunning clutch being constructed and arranged to drive its driven part when the driving member rotates in one direction and the driving part of the second overrunning clutch being constructed and arranged to drive its driven part when the driving member rotates in the other direction, the driven part of the first overrunning clutch being fast on the driven member, a gear on the driven member, a gear on the driven part of the second overrunning clutch, and gear means drivably connecting the two said gears.

2. In a power transmitting mechanism, the combination of a driving member, a driven member, two overrunning clutches each having an inner part and an outer part, the inner parts being fast on the driving member, the inner part of the first overrunning clutch being constructed and arranged to drive its outer part when the driving member rotates in one direction and the inner part of the second overrunning clutch being constructed and arranged to drive its outer part when the driving member rotates in the other direction, the outer part of the first overrunning clutch being fast on the driven member, a gear on the driven member, a gear on the outer part of the second overrunning clutch, and gear means drivably connecting the two said gears.

3. In a power transmitting mechanism, the combination of a driving member having a preselected direction of rotation and a driven member having the same direction of rotation, an overrunning clutch having driving and overrunning parts, the driving part being fast on the driving member and the overrunning part fast on the driven member whereby the driving member may drive the driven member directly in the preselected direction of rotation, a second overrunning clutch having one part fast on the driving member but wherein the part which is fast on the driving member may overrun its other part, a gear on the said other part of said second overrunning clutch, a second gear on the driven member, and gears drivably connecting the said second gear to the first said gear so constructed and arranged that rotation of the said second gear by the driven member in the said preselected direction rotates the first said gear in the said preselected direction.

4. In a power transmitting mechanism, the combination of a driving member, a driven member, two overrunning clutches each having a driving part and a driven part, one part of each clutch being fast on the driving member, the driving part of the first overrunning clutch being constructed and arranged to drive its driven part when the driving member rotates the driven member and the driving part of the second overrunning clutch being constructed and arranged to drive its driven part when the driven member rotates the driving member, the driven part of the first overrunning clutch being fast on the driven member, a gear on the driven member, a gear on the driving part of the second overrunning clutch, and gear means constructed and arranged to drivably connect the two said gears for rotation in the same direction.

5. In a power transmitting mechanism, the combination of a driving member having a preselected direction of rotation, a driven member, an overrunning clutch having a driving and an overrunning part, the driving part being fast on the driving member and the overrunning part fast on the driven member, a second overrunning clutch having a driving and an overrunning part, wherein the part which is fast on the driving member may overrun its other part in the preselected direction, a gear on the driven member, and speed changing gear means drivably connecting the said gear to the said other part of said second overrunning clutch so constructed and arranged that rotation of the said gear at a given speed by the driven member in the said preselected direction rotates the first said gear at a different speed in the said preselected direction.

6. In a power transmitting mechanism, the combination of a driving member having a preselected direction of rotation, a driven member, an overrunning clutch having a driving and an overrunning part, its driving part being fast on the driving member and its overrunning part fast on the driven member, a second overrunning clutch having a driving and a driven part, the driven part being fast on the driving member and may overrun its driving part in the preselected direction, a gear on the driven member, and speed reducing gear means drivably connecting the said driven member gear to the said driving part of said second overrunning clutch, so constructed and arranged that rotation of the said driven member gear by the driven member in the said preselected direction rotates the said driving member at a reduced speed in the said preselected direction.

7. In a power transmitting mechanism, the combination of a driving member, a driven member, an overrunning clutch having a driving part and an overrunning part, the driving part being drivably connected to the driving member to rotate therewith and the overrunning part being drivably connected to the driven member to rotate therewith, a second overrunning clutch having a driving part and an overrunning part, the overrunning part being drivably connected to the driving member to rotate therewith, a gear drivably connected to the driving part of the second overrunning clutch, a second gear drivably connected to the driven member, and gear means drivably connecting the said second gear to the first said gear.

8. In a power transmitting mechanism, the combination of a driving member, a driven member, an overrunning clutch having a driving part and a driven part, the driving part being fixed to the driving member for unitary rotation therewith and the driven part being adapted to overrun the driving part, a second overrunning clutch having a driving part and a driven part, the driven part being fixed to the driving member for unitary rotation therewith, a gear fixed to the driving part of the second overrunning clutch, a second gear fixed to the driven member, and gear means drivably connecting the said second gear to the first said gear.

9. In a power transmitting mechanism, the combination of a driving member, a driven member, an overrunning clutch comprising two coaxial annulae, one annulus being fast on the driving member and the other annulus being fast on the driven member and capable of overrunning the said one annulus in one direction of rotation of the driving member, a second overrunning clutch also comprising two coaxial annulae, one of the annulae of the second overrunning clutch being fast on the driving member and the second annulus of the second overrunning clutch being capable of overrunning the said one annulus of the second overrunning clutch in the other direction of rotation of the driving member, a gear fixed to the said second annulus of the said second overrunning clutch, a second gear fixed to the driving member, and gear means drivably connecting the said second gear to the first said gear.

JULIUS HULMAN.
CARL L. SADLER, Jr.

REFERENCES CITED

The following references are of record in the file of this patent:

UNITED STATES PATENTS

| Number | Name | Date |
|---|---|---|
| 708,286 | Wild, Jr. | Sept. 2, 1902 |
| 1,080,642 | McFarland | Sept. 9, 1913 |
| 1,140,132 | Dorsey | May 18, 1915 |
| 1,235,046 | Nikonow | July 31, 1917 |
| 2,047,174 | Baumgartner | July 14, 1936 |